United States Patent Office 2,759,914
Patented Aug. 21, 1956

2,759,914
PREPARATION OF POLYVINYL ALCOHOL WITH WATER WASHING OF GEL

William O. Kenyon, George P. Waugh, and Erle W. Taylor, Rochester, N. Y., assignors to Eastman Kodak Company, Rochester, N. Y., a corporation of New Jersey No drawing. Original application July 2, 1948, Serial No. 36,816, now Patent No. 2,642,420, dated June 16, 1953. Divided and this application April 20, 1953, Serial No. 349,942

14 Claims. (Cl. 260—91.3)

This invention relates to polyvinyl alcohol, and more particularly to improvements in production and purification of polyvinyl alcohol. More specifically, the invention relates to an improved method of preparing highly purified and substantially fully hydrolyzed polyvinyl alcohol which is suitable for use in the production of photographic emulsions or for use in other instances which require such refined polyvinyl alcohols.

This application is a division of our copending application S. N. 36,816 filed July 2, 1948, and entitled "Preparation of Polyvinyl Alcohol," now Patent 2,642,420 of June 16, 1953.

Heretofore several methods have been described for making polyvinyl alcohol and partial derivatives thereof. Nearly all of the desirable methods basically include a procedure for the deacetylation of polyvinyl acetate using acidic or alkaline reagents. The patents herein discussed are illustrative of such prior art methods for preparing polyvinyl alcohol. In U. S. Patent 1,672,156 of June 5, 1928, polymerized vinyl alcohol is prepared by treatment of polymerized vinyl acetate with alcoholic potash. The resulting polyvinyl alcohol exists as a voluminous powder which is water soluble. Films or sheets can be prepared by dissolving this powder in water and evaporating this water therefrom. In U. S. Patent 2,109,883, of March 1, 1938, it is stated that the reaction described in U. S. Patent 1,672,156 supra, is fundamentally a saponification reaction and the result is to have the desired polymerized vinyl alcohol powder contaminated to a more or less extent with alkaline salt which must be removed if a pure polyvinyl alcohol is desired. According to U. S. 2,109,883, this contamination is minimized by using absolute alcohol and only catalytic amounts of alkali or acid. In U. S. Patent 2,227,997 of January 7, 1941, the reaction described in U. S. Patent 2,109,883, supra, is discussed, i. e., the catalytic hydrolysis of polyvinyl esters comprising reacting the polyvinyl ester with an alcohol in the presence of a small amount of an alkali or a small amount of an acid as the hydrolysis catalyst. The chief products of the reaction are polyvinyl alcohol and methyl acetate. Because the catalyst is present only in a small amount, it is stated that no significant contamination of the product occurs and further purification is not required. Notwithstanding the improvement by using less catalyst, it is clear that since no purification step is disclosed, the polyvinyl alcohol still contains an appreciable amount of impurity resulting from the catalyst. In U. S. Patent 2,227,997, the patentee, an associate of the patentees of the above-mentioned patents, describes an improvement over their former procedures. This comprises dissolving the polyvinyl acetate in a small amount of the alcohol and adding a small amount of alkali to form a plastic doughy mass which, on mechanical working, i. e., kneading, is converted to a slurry of the hydrolysis product, and the slurry on further working is formed into a powder. It is emphasized in that patent the solvent alcohol should be anhydrous if a fully hydrolyzed polyvinyl alcohol is desired. If a partially hydrolyzed product is to be made, the reaction may be interrupted by neutralizing the catalyst, or by diluting the reaction by the addition of water. The product is obtained in powder form by distilling off the methyl acetate and other volatile constituents. It is stated that the amount of catalyst present in the final product does not appreciably contaminate it. Nevertheless, the product does contain catalyst impurities and sodium acetate.

We have found that such prior methods of producing polyvinyl alcohol may not give a sufficiently pure product so that it may be employed as a substitute for gelatin in the manufacture of photographic film and paper. In making these or comparable photographic articles, extremely small quantities of contaminants have a very great influence upon the quality of emulsions in which the polyvinyl alcohol is employed. Thus, we have found that even the small contamination mentioned in the above discussed patents, while permissible for many uses, may interfere if present in polyvinyl alcohol employed in photographic emulsions.

Also in electrical applications it is desirable to have a polyvinyl alcohol in a highly purified state so that it is substantially free from conductive salts.

An object of the present invention is, therefore, a method of preparing a highly pure polyvinyl alcohol in the form of a gel which is of such physical form, strength, and chemical composition that it is resistant to water, i. e., the gel will not dissolve in water at moderate temperatures and can, consequently, be washed with water to remove impurities therefrom.

Another object of the invention is a polyvinyl alcohol gel which can be washed in water at moderate temperatures without dissolving therein.

Another object is a method of preparing polyvinyl alcohol by which the acetyl content thereof may be controlled.

Still another object is a polyvinyl alcohol which has an extremely low acetyl content.

Another object is a method of preparing polyvinyl alcohol by which the viscosity thereof may be controlled.

Another object is a polyvinyl alcohol which has a high viscosity.

Still another object is a method of preparing polyvinyl alcohol gels by which the solids content is controlled.

Yet another object is a method of preparing polyvinyl alcohol gels by which the solubility temperature is controlled.

Other objects of the invention are methods for preparing polyvinyl alcohols which have one or more of the above-indicated properties in various combinations as may be desired. Other objects will appear hereinafter.

In accordance with the broad concept of the invention a polyvinyl alcohol in a gel form which is resistant to dissolving or sliming by water may be prepared by adding a deacetylation catalyst, such as an acid or alkali catalyst, to a solution of polyvinyl acetate, preferably while the solution is vigorously stirred. An alcohol solution of the polyvinyl acetate is preferred, and methyl alcohol is the preferred alcohol. The alcohol may contain up to 10% water but an increase in water content in the alcohol tends to the production of a less firm gel. The resulting deacetylation reaction produces polyvinyl alcohol in gel form which is resistant to water at moderate temperatures. Its washing characteristics and other characteristics can be modified by subsequent treatments such as described hereinafter. This gel is then washed in water to remove solvent, by-products of the reaction, and any unreacted catalyst, or catalyst residues. The washing may be intermittent, or continuous, or countercurrent.

In accordance with another feature of the invention, the resistance of the polyvinyl alcohol to water may be further improved by removal of residual acetyl groups from the polyvinyl alcohol chain of the deacetylation product.

This may be accomplished by treating the polyvinyl alcohol gel, formed as above described, with additional deacetylation catalyst. Alcoholic alkali, aqueous alkali, aqueous acid, or alcoholic acid may be employed for this additional deacetylation. In general, we have found that employing relatively large amounts of alkali deacetylation catalyst in the initial and subsequent deacetylation operations results in a polyvinyl alcohol of low acetyl content. We have also found that by permitting the gel to synerese and separating the syneresed liquid by-product before employing additional deacetylation operations will promote the production of low acetyl content polyvinyl alcohol. We have also found that the absence of water in the original deacetylation mixture tends to permit the production of low acetyl content polyvinyl alcohol.

If a polyvinyl alcohol is desired, which, while still washable with water, contains more acetyl groups on the polyvinyl alcohol chain, operations contrary to those just described will result in a higher acetyl content. Thus the presence of water in the initial deacetylation mixture, elimination of secondary deacetylation treatment, employing smaller amounts of alkaline catalysts, employing a relatively short initial deacetylation period, and employing a weak alkali in the second deacetylation treatment, will permit more acetyl to remain on the chain.

In accordance with another feature of the invention, we have found that the water absorption of the polyvinyl alcohol gel may be reduced by reducing the acetal content of the polyvinyl alcohol. There is usually little or no acetal in polyvinyl alcohol made by alkaline deacetylation (less than 0.2%), but when hydrochloric acid is employed as the catalyst, as much as 1 to 2% by weight acetal, calculated as acetaldehyde may be present. This may come from hydrolysis of a little residual monomer, resulting in condensation of the acetaldehyde thereby formed with the polyvinyl alcohol under the influence of the acid conditions. This small amount of acetal is sufficient to have some effect on the water absorption of the gel while washing, and also on the softening by water of photographic emulsions made using this polyvinyl alcohol. We have found that the acetal content of polyvinyl alcohol made in this way can be greatly reduced by a preliminary steaming of the polyvinyl acetate in the form of beads. We have also found that polyvinyl alcohol of the acid type having a still lower acetal content can be made by conducting the original deacetylation with alkali, and subsequently treating with alcoholic or aqueous acid.

In accordance with still another feature of the invention we have found that a polyvinyl alcohol of a relatively high viscosity may be prepared by conducting the original deacetylation with hydrochloric acid, or by treatment of a gel originally made by alkali deacetylation with aqueous or alcoholic hydrochloric acid.

We have also found that the clarity of the gel may be improved by a treatment with dilute acid which is not strong enough to cause a change in intrinsic viscosity. The color of the gel may be improved by bleaching with bleaching agents such as sulfur dioxide, hydrogen peroxide, chlorine, sodium hypochlorite and sodium bisulfite. The color may also be improved by employing additional alcoholic deacetylation steps after the initial deacetylation.

It is desirable to produce a gel having a high solids content of polyvinyl alcohol and this may be accomplished, we have found, by reducing the acetyl or acetal content of the gel, employing a prolonged syneresis time, and conducting the secondary deacetylation operations in the presence of water, methanol and methyl acetate.

It is also desirable, for photographic use, to produce a polyvinyl alcohol having a minimum of reducing action, as shown by the ammoniacal silver nitrate test.

In connection with photographic emulsion work, it is sometimes desirable that the polyvinyl alcohol have a high minimum solubility temperature. This property is attained by reduction of the acetyl or acetal of the gel, and may be enhanced by prolonged aging of the gel, or even aging at elevated temperatures.

A water washable polyvinyl alcohol gel may be prepared according to our invention, by either an alkali or acid catalyst. Alkali catalysts such as sodium hydroxide or potassium hydroxide are preferred although other alkali catalysts such as sodium methoxide or lithium hydroxide may be employed. Hydrochloric acid is the preferred acid catalyst but good washable gels are produced using sulfuric and other strong acids.

Methyl alcohol is the desirable alcohol to employ in making up the solution of polyvinyl acetate since the methyl acetate formed is quite soluble in water and, therefore, is easily washed from the gel, but ethyl alcohol or other higher alcohols may be employed.

The washing of the polyvinyl alcohol gel may be made with tap water, distilled water, or demineralized water, or the gel can be given a preliminary wash in water, then a dilute acid wash such as with dilute acetic or hydrochloric acid and then further washed with water. This weak acid treatment results in a gel which melts to a very clear solution and which is especially adaptable for use in preparing photographic emulsions.

After the initial gel formation, the gel may be subdivided, if desired, to facilitate further treatment in accordance with the invention. Such subdivision may be achieved, for example, by means of a grinder, a dicer or a mill.

When washing the gels it is desirable to employ water at a temperature of from 4 to 50° C. since the gel may be somewhat soluble in water above this upper temperature.

The various features of our invention are further described in the following examples:

*Example 1.—Acid deacetylation at 25° C.—Effect of syneresis time on concentration of gel.*

To 48.25 pounds of a methanol dope containing 22 percent by weight of V–60 polyvinyl acetate were added, with thorough stirring, 2400 cc. of 6 N aqueous hydrochloric acid. Six samples, see Table I, of the above mixture, weighing about 6.4 pounds each, were placed in separate closed containers and set in a bath at 25° C. After about 72 hours, all the samples had begun to form white, opaque gels. The samples were left in the bath for additional syneresing times as shown in Table I. The weights of the gel and syneresed liquids were determined. The gels were sliced and washed in distilled water at room temperature until no further test for chloride ion was obtained. A portion of each washed gel was blotted free from surface water and the solids content, i. e. polyvinyl alcohol determined by drying at 110° C. Minimum solubility temperatures were also run on the washed gels. Minimum solubility temperature (M. S. T.) is defined as the temperature at which a sample of a gel when vigorously stirred becomes a smooth solution. In the examples the terms V–6, V–60, etc., are employed in the usual sense, that is, the number refers to the viscosity in centipoises at 25° C. of a benzene dope containing 8.60 grams of the polyvinyl acetate per 100 cc. of the dope. These data are shown in Table I.

TABLE I

| Sample | A | B | C | D | E | F |
|---|---|---|---|---|---|---|
| Syneresis time____hours__ | 17¾ | 41¾ | 65¼ | 89¼ | 113¼ | 185¼ |
| Wt. of gel after syneresis grams__ | 2,694 | 2,117 | 1,896 | 1,738 | 1,673 | 1,635 |
| Wt. of syneresis liquid grams__ | 157 | 731 | 1,075 | 1,160 | 1,231 | 1,207 |
| Percent solid polyvinyl soluble alcohol in washed product_____ | | 3.9 | 9.3 | 11.2 | 13.2 | 13.6 |
| M. S. T._____°C__ | | | 60–2 | 68–9 | 69–70 | 71.3 |

It will be observed from the above table that prolonged syneresis time caused the gel to shrink, giving more syneresed liquid, and giving a gel which, on being washed in water, did not dissolve or swell unduly.

Example 2.—Alkaline deacetylation

Into 2000 grams of a 22 percent (by weight) methanol dope of V-60 polyvinyl acetate was stirred a solution of 8 grams of sodium hydroxide in 620 grams of methanol. The mixture became dark red and, after 5 minutes, began to gel rapidly. After a syneresis period of 24 hours at room temperature, the gel weighed 1730 grams, and 850 cc. of syneresed liquid had separated. The gel was sliced and washed for 90 hours in a number of changes of distilled water. The washed gel weighed 1763 grams, and was a tough, opaque white somewhat elastic product. It contained 10.3 percent solid and had an M. S. T. of 68–69° C.

Example 3.—Alkaline deacetylation with less catalyst

This is a parallel experiment to Example 2, but using 1968 grams of the methanol dope of polyvinyl acetate and a weaker alkaline catalyst solution comprising 0.98 g. of sodium hydroxide in 632 g. of methanol. Gelation required 2.4 hours. After 24 hours' syneresis, the gel weighed 2265 g. and the syneresed liquid was 220 cc. After slicing and washing in distilled water for 90 hours, the gel weighed 3457 g. It was a clear, highly swollen, slimy product containing 2.6 percent solid.

Comparison of Examples 2 and 3 shows the advantage of using a relatively large amount of alkaline catalyst as in Example 2.

Example 4.—Syneresis time series—Acid deacetylation at 40° C.

To 18,000 g. of 22 percent methanol dope of V-60 polyvinyl acetate were added, with thorough stirring, 1968 cc. of a mixture of equal parts of concentrated hydrochloric acid and water. The dope was split into six portions, each in a covered bottle, and these were placed in a 40° C. bath. In about 18 hours these dopes turned to gels.

One of these samples was removed after an additional 24-hour syneresis period. The tough, opaque white cake of polyvinyl alcohol weighed 2695 g. The syneresed liquid weighed 496 g. The gel was sliced and washed in a number of changes of distilled water as before. The other bottles were opened after longer syneresis times, and the gels similarly sliced and washed with water. The solids contents did not vary much and the minimum solution temperatures increased only slightly, indicating that 1 to 2 days' syneresis time with this amount of acid at 40° C. was sufficient. The data on this experiment are given in Table II.

TABLE II

| Syneresis Time | 24 hrs. | 48 hrs. | 72 hrs. | 96 hrs. | 120 hrs. | 144 hrs. |
|---|---|---|---|---|---|---|
| Percent Solids in washed gel | 12.1 | 14.3 | 12.7 | 13.1 | 12.2 | 13.1 |
| M. S. T. ° C. | 68 | 68 | 71 | 72 | 71-2 | 70-1 |

Example 5.—Effect of viscosity (molecular weight) of polyvinyl acetate on physical properties of washed polyvinyl alcohol gel—Alkaline deacetylation Six 22 per cent dopes of polyvinyl acetate, of various viscosities, indicated in the table as V-2.5, V-6, etc., were made up in methanol. To each was added alkaline catalyst (a 0.5 normal solution of sodium hydroxide in methanol) in the proportion of 1 cc. of catalyst solution per 10 g. of dope. Color developed, and the dopes set to firm gels. They were allowed to synerese for 40 hours, then were sliced and washed at room temperature in distilled water for 3 days. These gels were examined as to solids content and M. S. T. These data are summarized in Table III. It is apparent that by employing polyvinyl acetate of higher viscosities that a shorter gelation time and a higher solids content results.

TABLE III

| Polyvinyl Acetate | V-2.5 | V-6 | V-15 | V-30 | V-45 | V-60 |
|---|---|---|---|---|---|---|
| Color of dope on addition of catalyst. | Yellow | Red | Red | Orange | Pink | Red. |
| Time to gel | 35 min | 30 min | 30 min | 20 min | 15 min | 10 min. |
| Percent Solids | partly dissolved. | 8.2 | 11.3 | 17.8 | 17.2 | 19.2. |
| M. S. T. | | 65° | | 77° | 72° | 74°. |

Example 6.—Effect of increased syneresis time and temperature, alkaline deacetylation To a number of small samples of 24 per cent dope of V-80 polyvinyl acetate in methanol was added alkaline catalyst, in the proportion of 25 g. of a 3.71 per cent methanol solution of sodium hydroxide per pound of dope. These set to gels within a few minutes. They were set away at different temperatures for varying syneresis times, after which the gels were sliced and washed in running tap water. The gels were then ground in a meat grinder and given an additional washing period of 16 hours in running tap water, then were drained for one day to remove most of the surface water. They were analyzed for solids content and for per cent polyvinyl acetate. The results of the runs at 8, 30 and 50° C. are shown in Table IV.

TABLE IV

| Syneresis, Hours | at 8° C. | | at 30° C. | | at 50° C. | |
|---|---|---|---|---|---|---|
| | Percent Solids | Percent PVAc | Percent Solids | Percent PVAc | Percent Solids | Percent PVAc |
| 16 | 10.15 | 2.70 | 11.21 | 2.45 | 13.62 | 1.96 |
| 64 | 11.09 | 2.29 | 11.44 | 2.19 | 15.75 | 1.33 |
| 112 | 12.09 | 2.10 | 12.39 | 2.25 | [1] 25.96 | [1] 1.60 |
| 160 | 11.81 | 2.26 | 11.92 | 2.10 | [1] 23.85 | [1] 1.49 |

[1] These two samples partly dried out during the syneresis.

As shown in Table IV, both increased time and increased temperature are helpful in obtaining high solids and low polyvinyl acetate content. The fact that two of the samples at 50° C. dried out during the syneresis and gave unusually high solids, is in line with the results described in Examples 8, 9, 10, 11 and 12, where liquid was squeezed out of the gels.

The above samples did not vary significantly in viscosity. Specific viscosities in water taken at a concentration of 0.100 gram per 100 cc. of solution ranged from 0.101 to 0.112; corresponding to inherent viscosities taken in water at a concentration of 0.250 gram per 100 cc. of solution, of 0.96 to 1.06. These two viscosity functions may be designated as ($\eta$ sp) and $\{\eta\}$, respectively. Inherent viscosity is the same mathematical function as intrinsic viscosity, but measured at a finite concentration.

Example 7.—Effect of increased catalyst, at various times and temperatures, alkaline deacetylation A series of experiments was run similar to Example 5 above, except that approximately twice as much catalyst was used, that is, 50 g. of 3.71 percent solution of sodium hydroxide were added per pound of dope. This series was run at 30° and at 50° C. The solids and polyvinyl acetate determinations were made after washing, etc., as in Example 6 above. These are shown in Table V.

TABLE V

| Syneresis, Hours | at 30° C. | | at 50° C. | |
|---|---|---|---|---|
| | Percent Solids | Percent PVAc | Percent Solids | Percent PVAc |
| 16 | 13.28 | 1.33 | 16.18 | 0.89 |
| 64 | 13.77 | 0.95 | 16.11 | 0.53 |
| 112 | 13.22 | 0.74 | [1] 25.55 | [1] 0.70 |
| 160 | 13.22 | 0.71 | [1] 24.50 | [1] 0.69 |

[1] These two samples partly dried out during the syneresis.

It will be observed that increased time and temperature have an effect here similar to that in Example 6. Comparison of Examples 6 and 7 show that the use of more catalyst is definitely helpful in obtaining increased solid and low polyvinyl acetate content.

The above samples did not vary significantly in viscosity, either among themselves or from the products of Example 6 in Table IV above. Observed values were ($\eta$ sp) of 0.107 to 0.111, or $\{\eta\}$ (or inherent viscosity) of 1.02 to 1.05.

*Example 8.—Deacetylation using a mixer*

In a stainless steel mixing mill equipped with Sigma blades, of approximately 4 gallons working capacity, were placed 8 lbs. 2 oz. of V-22 polyvinyl acetate in the form of small spheres or "beads," and 18.9 lbs. of methanol. After this was all doped, 1350 g. of 3.71 percent solution of sodium hydroxide in methanol were added, with continued mixing. After 11 minutes a gel formed. The mixer was run for an additional two hours, after which the product was withdrawn. It was in the form of damp flakes, with considerable syneresed liquid. A sample of these flakes was allowed to stand in the syneresed liquid for one day at room temperature, followed by three days' washing and one day's draining. The solids on this sample was 21.39 percent; the polyvinyl acetate content 1.37 percent. The M. S. T. observed was 80° C. which is higher than that obtained by the methods shown in the other examples and appears due to the milling action.

*Example 9.—Deacetylation using a mixer—Use of fresh alkaline liquid*

Part of the polyvinyl alcohol flakes obtained from the mixer in the above experiment were drained free of excess syneresed liquid, and were covered with a methanol solution made up to represent about the original alkalinity, that is, containing 50 g. of 3.71 percent methanol solution of sodium hydroxide, per pound of methanol. After one day at room temperature, followed by three days of washing and one day of draining, this sample showed a solids content of 26.61 percent and a polyvinyl acetate content of only 0.74 percent. The M. S. T. was 88° C.

This indicates the advantage of discarding the syneresed liquid and using a fresh solution of catalyst in order to obtain a product having higher solids and lower acetyl.

*Example 10.—Deacetylation using a mixer—Use of fresh alkaline liquid containing stronger alkali*

In the same mixer as was used in the above example, polyvinyl alcohol shreds were made by a similar alkaline deacetylation. The mixer was stopped 1.5 hours after addition of the catalyst, and the material withdrawn. About 10 lbs. of damp flakes of polyvinyl alcohol were thus obtained, and over 16 lbs. of syneresed liquid. The damp flakes were covered in a crock with an alkaline liquid corresponding to about 3 times the normal original alkalinity. This comprised 155 g. of sodium hydroxide in 33 lbs. of methanol. After standing thus for one day, with occasional stirring, the flakes were washed for four days in cold running water and drained for one day. Analysis showed 26.32 percent solids and 0.43 percent polyvinyl acetate. The M. S. T. was 88° C. and the $\{\eta\}$ was 0.72.

This shows that by using methanol containing more alkali to replace the syneresed liquid the acetyl can be further decreased although comparison with Example 8 shows that in these cases no significant change in solids or M. S. T. was observed.

*Example 11.—Deacetylation using a mixer—Short reaction time*

In the same mixer the original deacetylation with formation of polyvinyl alcohol flakes was done as in Example 10 above. The flakes were put to washing in cold water 2.3 hours after the addition of sodium hydroxide. After four days' washing and one day's draining, the solids was 19.63 percent, the polyvinyl acetate content 1.66 percent. The M. S. T. was 80° and the $\{\eta\}$ was 0.76.

*Example 12.—Deacetylation using a mixer—Replacement of alkaline liquid with acid*

A dope of polyvinyl acetate was converted to polyvinyl alcohol flakes using alkaline catalyst as in Example 11 above. About 2.5 hours after the addition of the alkaline catalyst, the polyvinyl alcohol flakes were drained and covered in a crock with 25 lbs. of a solution of 3 lbs. of concentrated hydrochloric acid in 30 lbs. of methanol. After standing for one day, with occasional stirring, the flakes were washed in cold running water for 3 days and drained for one day. Analysis showed 25.65 percent of solids and 1.10 percent polyvinyl acetate. The M. S. T. was 86° and the $\{\eta\}$ was 0.85. By comparison with Examples 10, 11, 13, 14, 15 and 16, it will be seen that this viscosity is typical alcohol made by acid deacetylation, rather than alkaline, of V-22 polyvinyl acetate. Thus, at least one clearly recognizable property of acid-type polyvinyl alcohol has been imparted by soaking the alkali-formed flakes in acid.

*Example 13.—Alkaline deacetylation—Use of hydrogen peroxide to avoid color*

To 1900 g. of a 30 per cent dope of V-22 polyvinyl acetate in methanol, were added 6.3 cc. of 30 per cent hydrogen peroxide, with continuous stirring. After 10 minutes were stirred in 315 g. of alkaline catalyst, a 3.71 per cent solution of sodium hydroxide in methanol. The dope turned red immediately upon addition of the catalyst, but this color rapidly faded and it became colorless within a few minutes. Eight minutes after adding the catalyst, a colorless translucent gel had formed. After 5 days at room temperature, this gel was sliced, washed, ground, rewashed, and drained for one day. Analysis showed 13.13 per cent solids and 1.77 per cent polyvinyl acetate. It showed an $\{n\}$ of 0.75 in water.

The light color of this polyvinyl alcohol was due to the use of hydrogen peroxide, as the particular batch of polyvinyl acetate used in this experiment had, on previous occasions, given a much darker red upon addition of the alkaline catalyst, and the resulting polyvinyl alcohol gel was a fairly deep yellow.

It will be noted that more alkaline catalyst is necessary when hydrogen peroxide is used in this deacetylation. Use of the normal amount of sodium hydroxide, the proportion used in Example 8, gives a softer gel of higher acetyl content in the presence of a similar amount of hydrogen peroxide.

*Example 14.—Acid deacetylation—Use of hydrogen peroxide for bleaching*

To 1900 cc. of 30 per cent methanol dope of V-22 polyvinyl acetate, of a type which gave much color with alkaline catalyst, were added with stirring, 6.3 cc. of 30 per cent hydrogen peroxide. After a few minutes, 208 cc. of a 1:1 mixture of concentrated hydrochloric acid in water stirred in and the dope placed in a 50° bath. After about 54 hours, the resulting gel was washed in cold running water for 5 days, ground in a meat grinder, and re-washed for 4 hours more. Analysis showed 11.72 per cent solids, 1.16 per cent polyvinyl acetate, 1.29 per cent acetal calculated as acetaldehyde, and an $\{n\}$ of 0.83.

*Example 15.—Polyvinyl alcohol of low acetal content by acid hydrolysis—Use of steamed polyvinyl acetate*

V–22 polyvinyl acetate was made by polymerization in the form of small spheres or "beads" of approximately 10- to 40-mesh size. This was done by polymerization with agitation in the presence of water, using starch as the dispersing agent. When the polymerization was complete, an excess of steam was passed into the reaction mixture, with continuous stirring, thus keeping the temperature at approximately 100° C. for 10 minutes. The polyvinyl acetate beads were then washed in cold running water and dried at room temperature.

A 30 per cent dope was made of this polyvinyl acetate in methanol. To this was added a mixture of concentrated hydrochloric acid and water 1:1 in the proportion of 49.6 cc. per pound of dope. This was maintained at 50° C. for 54 hours, during the first 18 hours of which time it set to a firm white gel. The gel was sliced, washed, in running water for 5 days, ground in a meat grinder, re-washed for 4 hours, and drained for one day. This gel had 12.68 per cent solids. Analysis showed 1.21 per cent polyvinyl acetate and 0.46 per cent acetal calculated as acetaldehyde, on a dry basis. The $\{n\}$ of this polyvinyl alcohol in water was found to be 0.81.

*Example 16.—Polyvinyl alcohol by acid hydrolysis*

In an experiment exactly like Example 16 above, except that the polyvinyl acetate beads were washed directly instead of being steamed, the gel was of similar appearance and contained 11.70 per cent solids. Analysis showed 1.27 per cent polyvinyl acetate and 1.83 per cent acetal calculated as acetaldehyde, on a dry basis. The $\{n\}$ of this polyvinyl alcohol was found to be 0.82 in water.

Several polyvinyl acetates, some of which had been steamed in bead form and some which were not, were deacetylated by acid or alkali catalyst, the syneresed gels washed, drained and analyzed. The results are shown in Table VI.

TABLE VI

| Polyvinyl Acetate | | | Polyvinyl Alcohol Gel | | | | |
| --- | --- | --- | --- | --- | --- | --- | --- |
| Type | Steamed | $\{\eta\}$ | Catalyst | Percent Solids | Percent PVAc | Acetal as percent HAc | $\{\eta\}$ |
| V–22 | No | 0.72 | HCl | 11.70 | 1.27 | 1.83 | 0.82 |
| V–22 | Yes | 0.78 | HCl | 12.68 | 1.21 | 0.46 | 0.81 |
| V–80 | No | 1.34 | HCl | 9.84 | .67 | 2.09 | 1.10 |
| V–80 | Yes | 1.48 | HCl | 11.25 | .70 | .50 | 1.10 |
| V–22 | No | | NaOH | 15.37 | 1.51 | | .73 |
| V–22 | Yes | 0.72 | NaOH | 15.56 | 1.55 | | .72 |
| V–80 | No | 1.34 | NaOH | 15.96 | 1.23 | | 1.01 |
| V–80 | Yes | 1.48 | NaOH | 15.71 | 1.28 | | 1.04 |

In Table VI the acetyl and acetal are calculated on the solid basis. The differences between steamed and unsteamed samples in acetyl are within experimental error. When acid catalyst was used, the polyvinyl alcohol gel obtained from steamed polyvinyl acetate had higher solids than from unsteamed polyvinyl acetate. This was due to the fact that the residual acetal groups in the polyvinyl alcohol increase its affinity for water. Samples of polyvinyl alcohol made using alkaline catalyst have always shown negligible acetal.

*Example 17.—Acid deacetylation using sulfuric acid*

To 100 g. of a 30 per cent methanol dope of V–22 polyvinyl acetate was added a mixture of 5.5 g. of sulfuric acid and 13.8 g. of methanol. The dope was maintained at 50° for 48 hours, during the first 6 hours of which time it set to a gel and began to synerese. The gel was sliced, washed, ground, re-washed, and drained for one day. The gel had 6.66 per cent solids, and a M. S. T. of 58°. Analysis showed 1.04 per cent polyvinyl acetate on a dry basis.

*Example 18.—Deacetylation of a copolymer of vinyl acetate and vinyl chloride—Alkaline catalyst*

To 137 g. of a 22 per cent methanol dope of a copolymer of vinyl acetate and vinyl chloride, containing 2.4 per cent of the latter, were added 15.1 g. of a 3.71 per cent methanol solution of sodium hydroxide. A light pink color developed, and a gel formed in 10 minutes. After 48 hours at room temperature, the gel was washed, etc., as in Example 17. The gel looked much like ordinary polyvinyl alcohol gel. It melted at 72° to a cloudy dope, which was made clear by the addition of half its volume of methanol. Analysis showed 12.33 per cent solid and 1.90 per cent polyvinyl acetate. The gel blackened when dried in a vacuum oven at 60°. The dry product contained 2.5 per cent chlorine. The calculated value, assuming no hydrolysis of vinyl chloride, is 2.6 per cent chlorine.

*Example 19.—Deacetylation with sodium methoxide*

An experiment was made by the general method of Example 7 in which the sodium hydroxide deacetylation catalyst was replaced by an equivalent amount of sodium methoxide, made by reacting sodium and methanol. A slightly lower polyvinyl acetate content was obtained, 1.3 per cent compared with 1.5 to 1.6 for the checks using sodium hydroxide.

*Example 20.—Use of additional steeping liquids*

A dope of V–80 polyvinyl acetate was converted to polyvinyl alcohol as in Example 12 in which a gel was set up in a Sigma blade mixer using alkaline catalyst, which was then drained and a part of the gel covered with a mixture of three parts concentrated hydrochloric acid and 30 parts of methanol by weight. It was then washed in running water. Another portion of the same gel, after being removed from the mixer, was steeped in a mixture of 141 grams of sodium hydroxide and 33 pounds of methanol for one day, then steeped in methanolic hydrochloric acid as above, then washed in running water.

The following analyses show that the acetyl, calculated as polyvinyl acetate and the acetal, calculated as acetaldehyde, were considerably reduced by this intermediate treatment.

| | Percent Solids | Percent P. V. Acetate | Acetal as Percent HAc |
| --- | --- | --- | --- |
| 2 State | 27.31 | 0.82 | 0.43 |
| 3 State | 27.47 | 0.33 | 0.23 |

*Example 21.—Tray method with alkaline catalyst*

To 45 pounds of a 24% dope of V–22 polyvinyl acetate in methanol was added with thorough mixing 5 pounds of alkaline catalyst, comprising a 3.71% solution of sodium hydroxide in methanol. After 14 minutes the dope began to set to a gel. After 2 minutes more it was transferred to a tray. After 3 minutes in the tray it was sliced and ground in a meat grinder, which required ten minutes. After standing for an hour at room temperature, considerable liquid had syneresed out, which was discarded. The gel was covered with a solution of 141 g. of sodium hydroxide in 33 pounds of methanol. After two days at room temperature, with occasional stirring, the gel was washed with cold running water for two days and drained.

*Example 22.—Tray method with acid treatment*

Two pounds of the aqueous gel prepared as described in Example 21 was soaked for two days with occasional stirring in a mixture of 200 cc. of concentrated hydrochloric acid and 1800 cc. of water. It was then washed for two days and drained.

11

*Example 23.—Tray method with alkaline catalyst*

To 40 pounds of a 30% dope of V-9 polyvinyl acetate in methanol was added with thorough stirring 8 pounds and 14 ounces of a 3.71% solution of sodium hydroxide in methanol. Seven minutes later the dope began to gel. After one additional minute it was transferred to a tray. After an additional four minutes it was sliced and ground as above, which required ten minutes. After standing an hour at room temperature, the gel had syneresed considerable liquid, which was drained off and discarded. The gel was covered with a solution of 377 grams of sodium hydroxide in 47 pounds of methanol, and allowed to stand at room temperature with occasional stirring for two days. It was then washed for two days in running water and drained.

*Example 24.—Tray method with acid treatment*

Two pounds of the aqueous gel of Example 23 was soaked in a mixture of 200 cc. of concentrated hydrochloric acid and 1800 cc. of water for two days. It was then washed and drained.

The analysis of the products of Examples 21 to 24 is shown in the following table.

TABLE VII

| Example | Type | Percent Solids | Percent P. V. Ac | $\{\eta\}$ | M. S. T., degree |
|---|---|---|---|---|---|
| 21 | Alkali V-22 | 16.02 | 0.66 | 0.69 | 70 |
| 22 | Acid V-22 | 17.61 | 0.14 | 0.78 | 76 |
| 23 | Alkali V-9 | 13.99 | 0.58 | 0.54 | 68 |
| 24 | Acid V-9 | 16.33 | 0.27 | 0.61 | 71 |

*Example 25.—Steeping gels in alkali*

In the tray method, two days of steeping in methanolic alkali are desirable to obtain low acetyl content, as shown in the following table showing analytical results on gels made this way, which were steeped for three different lengths of time in alkaline methanol.

TABLE VIII

|  | Hours of Steeping | Solids | P. V. Ac | M. S. T., degrees |
|---|---|---|---|---|
| V-22 | 6 | 10.27 | 1.48 | 64 |
|  | 24 | 13.16 | 1.02 | 69 |
|  | 48 | 16.02 | .66 | 70 |
| V-9 | 6 | 9.20 | 1.41 | 63 |
|  | 24 | 10.45 | 1.08 | 66 |
|  | 48 | 13.99 | .58 | 68 |

*Example 26.—Use of $SO_2$ as a bleach*

Samples of aqueous polyvinyl alcohol gel of approximately 15% solids content were made by alkaline deacetylation of V9 and V22 polyvinyl acetate respectively in methanol, during 5 days at room temperature, followed by washing in water. This follows the general method of Example 7.

Samples of each of these gels were soaked for one day in nearly saturated solutions of sulfur dioxide in water, then washed in water. During the treatment, it was observed that most of the bleaching took place during the first one to four hours. Comparisons were made of the washed gels, as to color, minimum solution temperature, clarity of dope formed by melting, and inherent viscosity in water.

TABLE IX

| Polyvinyl Acetate | Bleach | Appearance and Gel Color | MST. °C. | Clarity of Dope | $\{\eta\}$ |
|---|---|---|---|---|---|
| V9 | None | Firm, clear, light yellow. | 63 | Clear | 0.58 |
| V9 | $SO_2$ | Firm, clear, colorless. | 65 | do | 0.57 |
| V22 | None | Firm, clear, very light yellow. | 67 | Hazy | 0.73 |
| V22 | $SO_2$ | Firm, clear, colorless. | 69 | Clear | 0.76 |

12

The differences found in inherent viscosity between treated and untreated gels are within experimental error. Dopes made from the treated and untreated gels were also tested for reducing materials by the ammoniacal silver nitrate test. In each case the sulfur dioxide-treated sample was found to be more free from reducing materials.

Thus the sulfur dioxide treatment is desirable from the standpoint of appearance, clarity of dope, and absence of reducing materials. The improved clarity is no doubt due to removal of insoluble calcium salts such as carbonates. There are not adverse effects on the gel from this treatment.

It will be observed in some of the examples that variations in the deacetylation conditions do not affect the inherent viscosity of the polyvinyl alcohol formed, within experimental error, except that there is a noticeable and uniform difference between inherent viscosities of polyvinyl alcohol made by acid and by alkaline deacetylation. The molecular weight of the polyvinyl acetate used is, of course reflected in the inherent viscosity of the resulting polyvinyl alcohol. It is of interest that the products made by the use of the mixer although showing a much higher minimum solution temperature than products made by massive deacetylation using comparable formulas showed little or no difference in inherent viscosity. After being melted or doped in hot water polyvinyl alcohols made by these two methods behaved similarly.

The molecular weight of the original polyvinyl acetate also influences the properties of the resulting polyvinyl alcohol. We have found, other conditions being equal, a higher molecular weight polyvinyl acetate will give a polyvinyl alcohol of lower acetyl, and the washed gel will contain less water and usually have a higher minimum solution temperature. These last two factors are not always met in practice, however, since as a matter of convenience a more dilute dope of the higher molecular weight polyvinyl acetate may be used.

The concentration of the dope in which the gel sets up, that is, including both the volume of polyvinyl acetate and the volume of the catalyst, affects the minimum solution temperature and the solids content of the gel in that the more concentrated the dope the higher the solids content and the higher the minimum solution temperature, within limits.

The presence of water, even in relatively small amounts, in an alkaline deacetylation tends to make the deacetylation slower and less complete, and results in a softer gel of lower solids content and of lower minimum solution temperature. Water is present in the acid hydrolysis, but in this case it does not have nearly as great an effect.

The concentration of the catalyst, expressed as amount of sodium hydroxide per unit weight of dope, influences the alkaline deacetylation quite markedly, higher catalyst concentration causing a more rapid gelling, and also lower acetyl, a higher solids content of the gel, and a higher minimum solution temperature. This is shown by a comparison of Examples 2 and 3 and also 6 and 7 above. The concentration of acid has a similar effect but is considerably less marked.

Higher temperatures favor more rapid reaction, higher solids content in the washed polyvinyl alcohol gel, and lower acetyl. This effect is not extreme, however, and for the sake of convenience, room temperature may be used especially when using alkaline catalyst. Comparison of Examples 1 and 4, in which similar amounts of acid catalyst were used shows the benefit of using elevated temperature in acid hydrolysis. The temperature attained in ordinary equipment is limited by the presence of methanol and methyl acetate which form a low-boiling constant boiling mixture.

The time of syneresis is definitely a factor, as shown in Examples 1, 6, 7, 8, and 10. Longer time promotes higher solids content, higher minimum solution temperature, and lower acetyl, but under any particular set of reaction conditions these qualities approach a limit, so that extremely long syneresis times are not economical.

There appears to be a direct relationship between the solids content of the gel before washing and the solids content after washing. This is indicated in Examples 8, 9, 10, 11 and 12 in which considerably more liquid than usual had separated out in early stages of the deacetylation. These gels also when washed had quite a high solids content.

The temperature of the wash water affects the solids content of the washed gel, but not very greatly within ordinary washing temperature ranges. For example, a polyvinyl alcohol made by alkaline deacetylation of V-22 polyvinyl acetate, washed in cold water, about 5° C. had a solids content of 13.4% whereas a similar polyvinyl alcohol washed at approximately 25° C. had a solids content of 16%. The effect of washing temperature on polyvinyl alcohol made by acid hydrolysis appears to be even less. Of course, the wash water must not be too warm as the polyvinyl alcohol will take up a great deal of water at temperatures approaching its minimum solution temperature.

The solids reported in the examples have been found to be quite reproducible, for instance, among gels made the same way and washed at the same temperature, the solids of all usually agree within ±0.5%. We have observed, however, that there is a considerable tendency of the washed gel to lose water on standing, especially if it was washed in cold water and then stands at room temperature. As an illustration, a polyvinyl alcohol gel made by alkaline deacetylation of V-80 polyvinyl acetate contained 13.65% solids after one day's draining, but after standing for five weeks at room temperature (approximately 25° C.) in a closed bottle, the upper part showed a solids content of 18.01%. The separated water was present in the bottom of the bottle. This tendency is reduced in the case of gels having relatively high solids content; the gels made by using a mixer showed little such separation of water.

The choice of the catalyst is a major factor in the preparation of the polyvinyl alcohol. When the deactylations are done as in Examples 2, 3, 5, 6, 7, 13 and 18 above, that is, not using extreme conditions, the alkaline procedure may give a product of slightly higher acetyl, a lower intrinsic viscosity, and little or no acetal, whereas the acid process may give slightly lower acetyl, a higher intrinsic viscosity and an appreciable amount of acetal. When used in the photographic emulsions, they also have different properties.

Although most of the examples show the deacetylation of polyvinyl acetate by hydrochloric acid or sodium hydroxide, which is the operation we have found most useful in our work, the processes should be capable of much wider application. Example 17 shows the use of sulfuric acid as a catalyst. We believe that any suitable strong acid could be used successfully, although some of the common acids, such as nitric or perchloric would, of course, be unsuitable for use in the presence of methanol.

The examples show the use of methanol but other solvents can be employed as ethyl alcohol or the higher alcohols, such as n-propyl, iso-propyl, n-butyl, sec-butyl and tert.-butyl. Experiments with these other alcohols gave inferior results especially in that the gels were softer, of lower solids content, and showed a yellow or brown color. Also, methanol has the advantage that methyl acetate is quite soluble in water and, therefore, is easily removed. Also, methanol is relatively cheap and available.

The process as indicated in Example 8 is applicable to copolymers of vinyl acetate having comparatively small proportions of other materials so that the product formed might be considered a modified polyvinyl alcohol. Such materials are sometimes desired, in order to obtain desirable solubility, insolubility or other properties. Example 18 shows the deacetylation of a vinyl acetate-vinyl chloride copolymer to give a modified polyvinyl alcohol which has the useful property of tolerating more organic solvent in its aqueous dope than does ordinary polyvinyl alcohol. The process is also adaptable for other polyvinyl esters, such as polyvinyl propionate, butyrate, etc.

It has been observed that any method or choice of conditions which leaves a considerable amount of acetyl in the molecule gives a fairly soft washed gel of relatively low solids content. The same tendency has been observed regarding the presence of acetal, but to a less marked extent. This is probably because under ordinary conditions it is easy to leave considerable acetyl on the molecule but the amount of acetal formed is ordinarily rather limited. Experiments in which polyvinyl alcohol has been deliberately modified by acetalizing some of the hydroxyls with acetaldehyde have shown this effect clearly, a few percent of acetal causing a great increase in the water absorption. It is well known that partially deacetylated polyvinyl acetate containing from about 40 to 80% polyvinyl aclohol, or polyvinyl acetals containing over about 50% polyvinyl alcohol are water soluble.

We believe that improvements in the gel, that is, higher solids and greater firmness come largely as a result of redicing these two undesirable features, that is to say, as a result of obtaining purer polyvinyl alcohol.

As shown above, sodium hydroxide in aqueous solution is quite effective in reducing the residual acetyl content of a polyvinyl alcohol gel. However, for certain purposes, such as more ready solubility, it may be desired to remove only part of the acetyl and have a certain residual amount in the polyvinyl alcohol. This can be accomplished by varying the concentration of the aqueous sodium hydroxide solution as shown in Example 27.

*Example 27.—Control of residual acetyl by use of weak alkalies*

A polyvinyl alcohol gel was made by alkaline deacetylation of a 30 per cent methanolic dope of V-22 polyvinyl alcohol for 5 days at room temperature, followed by slicing, washing, subdividing further, and rewashing.

Samples of this gel were soaked with occasional stirring for one day in various concentrations of aqueous alkali, followed by washing in water. Analysis showed the following:

TABLE X

| | Percent Solids | Percent PVAc | M. S. T., degrees C. |
|---|---|---|---|
| Untreated (original gel) | 14.44 | 1.66 | 64.5 |
| Soaked in 0.50 N NaOH | 17.97 | 0.14 | 76 |
| Soaked in 0.30 N NaOH | 17.55 | 0.09 | 76 |
| Soaked in 0.15 N NaOH | 17.97 | 0.11 | 76 |
| Soaked in 0.10 N NaOH | 17.81 | 0.18 | 75 |
| Soaked in 0.05 N NaOH | 16.49 | 0.34 | 74 |
| Soaked in 0.025 N NaOH | 15.57 | 1.04 | 69 |
| Soaked in 0.010 N NaOH | 14.89 | 1.50 | 64.5 |

It will be observed that the operating range for this purpose is from about 0.1 N to about 0.01 N. The former showed no significant difference from higher concentrations, and 0.01 N showed little change from the original.

A similar effect can be obtained, with better control of residual acetyl, by using weaker alkalies such as ammonium hydroxide, trisodium phosphate, sodium carbonate, a mixture of sodium carbonate and sodium bicarbonate, etc. A pH of from about 10 to about 11 or 12 is most useful for this purpose. Generally speaking, the higher the pH the lower the residual acetyl. This is shown in Examples 28 and 29.

*Example 28.—Control of residual acetyl by use of weak alkalies*

A sample of gel made as in Example 27 was similarly treated with 1 N ammonium hydroxide and washed. Analysis showed 16.23 per cent solids and 0.45 per cent polyvinyl acetate.

Example 29.—Control of residual acetyl by use of alkalies

A polyvinyl alcohol gel was made by deacetylating with methanolic sodium hydroxide a 30 per cent solution of V–22 polyvinyl acetate in 93.5 per cent methanol (6.5 per cent water), and ground in a meat grinder while fresh. After standing for one day at room temperature, the syneresed liquid was discarded, and the gel was washed in water and drained. Samples of this gel were soaked for one day with occasional stirring, in an equal weight of dilute aqueous solutions of various alkalies as shown in the table below. The strengths listed are after allowing for dilution by the gel. The gels were again washed in water, soaked in approximately 0.1 N acetic acid, further washed, drained and analyzed. The results are shown below.

TABLE XI

| Treating Solution | Percent Solids | Percent PVAc. | M. S. T., degrees |
|---|---|---|---|
| None | 10.90 | 3.04 | 61 |
| 0.1 N (NaPO$_3$)$_6$ | 11.34 | 2.64 | 64 |
| 0.01 N NaOH | 12.98 | 0.93 | 72 |
| 0.01 N Na$_2$CO$_3$ | 12.30 | 1.46 | 68 |
| 0.03 N Na$_2$CO$_3$ | 13.18 | 0.61 | 72 |
| 0.10 N Na$_2$CO$_3$ | 13.69 | 0.39 | 76 |
| 0.10 N Na$_3$PO$_4$ | 13.71 | .26 | 77 |
| 0.05 N Na$_2$CO$_3$ / 0.05 N NaHCO$_3$ | 12.49 | 1.36 | 68 |

When alkaline gels are washed in tap water, especially if carbonate ion is in the gel, the washed gel gives a more or less hazy dope when melted. This is because of the formation of insoluble salts, principally calcium carbonate. This can easily be avoided by treating the gel with acid, then washing. Dilute weak acid such as acetic acid can be used in almost any concentration as from 0.001 N (0.006%) to 4 N (24%), although our preferred concentration is approximately 0.1 N (0.6%) acetic acid. Other acids, such as sulfurous or hydrochloric, in concentrations of from 0.001 N to 0.1 N can be employed, the only requirement being that they must dissolve calcium carbonate, without harming the polyvinyl alcohol gel. The use of acids to remove calcium carbonate, etc. from the polyvinyl alcohol gel is also shown in Examples 26 and 29.

We have found that a gel may be set up in methanol, or methanol containing a little water, by addition of methanolic alkali to a polyvinyl acetate dope as usual, and the acetyl further reduced by addition of aqueous alkali, without washing. The syneresis liquid may be discarded or not. Usually it is advantageous to discard it, to avoid having to use enough alkali to saponify all the methyl acetate formed during the original methanolysis. This removal can be carried further by washing out part of it, as in Example 30. Allowing the gel to synerese before this treatment is desirable, from the standpoint of firmness of the final washed gel. Our prefered syneresis time is from one hour to one day, although it will be observed that in Example 30 little or no syneresis time is allowed.

The alkali used may be a strong alkali as sodium hydroxide, or a weak alkali such as sodium carbonate, or a mixture. Sodium carbonate reacts to form sodium bicarbonate, so that when an excess is used, the pH is about 10 at the end of the reaction. Also, when most of the alkali is sodium hydroxide and an excess of sodium carbonate used, the sodium hydroxide is presumably used up, leaving excess sodium carbonate and formed sodium bicarbonate to determine the pH. This is useful to avoid unduly reducing the residual acetyl.

The benefit of the presence of organic liquid in the aqueous treatment is that the solids content of the final washed gel is much higher than when only water is used. Other liquids than the mixture of methanol and methyl acetate could be used, but that would involve washing or otherwise removing the liquid present and replacing with other liquids. We have done this with fresh methanol, and obtained similar results, but it is obviously a great saving of chemicals and labor to use the liquid already present. These methods are shown in Examples 30, 31, 32 and 33.

Example 30.—Alkali and acid treatment

A 30% methanolic dope of V–22 polyvinyl acetate was deacetylated by addition of 4% its weight of a 10% solution of sodium hydroxide in methanol. The gel was ground while still fresh, within 5 minutes of the time the gel set up, and covered with 2 liters of an aqueous solution containing 106 grams of sodium hydroxide. After standing at room temperature for 2 days, with occasional stirring, the gel was washed, acidified with acetic acid, washed, and drained. Analysis showed 17% solids, 0.26% polyvinyl acetate, and a minimum solution temperature of 83° C.

Example 31.—Deacetylation in presence of methanol-methyl acetate using sodium carbonate To a 25% dope of V–22 polyvinyl acetate, containing approximately 4% water, was added 4% of its weight of a 10% solution of sodium hydroxide in methanol. The resulting gel was sliced and ground while still fresh, and allowed to synerese for one day at room temperature. During this time the original gel syneresed to the extent that it weighed 48% of its original weight. One pound of this gel was added to a solution of 212 grams of sodium carbonate in 2 liters of water, allowed to stand with occasional stirring for 2 days, washed briefly in water, water and acetic acid were added sufficient to make the entire volume 0.1 N, and after one day washing was resumed. The resulting polyvinyl alcohol gel was drained and analyzed. It was a firm gel of 22.12% solids, 1.27% polyvinyl acetate, with a minimum solution temperature of 72° C.

Example 32.—Additional deacetylation with sodium hydroxide and sodium carbonate An alkaline polyvinyl alcohol gel weighing 40 pounds was set up as in Example 31, and allowed to synerese for 1.5 hours. During this time it syneresed to 50% of its original weight. The liquid was discarded, and the gel covered with a solution of 3 pounds 8 ounces of sodium carbonate and one pound 6 ounces of sodium hydroxide in 75 pounds of water. The mixture was allowed to stand at room temperature with occasional stirring. Samples were removed at one and two days, washed, acidified with acetic acid, washed and drained. Analysis shows:

1-day sample, 24.03% solids, 0.82% polyvinyl acetate, 81° C. minimum solution temperature.

2-day sample, 25.20% solids, 0.62% polyvinyl acetate, 80° C. minimum solution temperature.

Example 33.—Additional deacetylation by sodium carbonate in presence of a reduced amount of methanol-methyl acetate mixture Five pounds of freshly ground gel of V–22 polyvinyl alcohol, originally formed as in Examples 31 and 32 was allowed to stand at room temperature for one hour. Without removing the syneresed liquid, 2 pounds 14 ounces of water was added to cover the gel. The mixture was stirred occasionally and allowed to stand at room temperature for one day. It was drained, leaving 3 pounds 5 ounces of gel. This was covered with 5 pounds 2 ounces of water, allowed to stand for 3 hours with occasional stirring, and again drained, leaving 3 pounds 5 ounces of gel. This was covered with 5 pounds 2 ounces of water, allowed to stand for 3 hours with occasional stirring, and again drained, leaving 4 pounds of gel. This was covered with 5 pounds 2 ounces of water containing 118 grams of 95% sodium carbonate, stirred, and allowed to stand at room temperature for one day. The gel was drained, given two 3-hour washes, soaked for 18 hours in water containing acetic acid sufficient to make the entire volume 0.1 normal, then washed to neutrality in tap water and drained. Analysis showed 16.24% solids, 1.60% polyvinyl acetate, and a minimum solution temperature of 70° C.

*Example 34.—Soaking gel to increase solids*

A polyvinyl alcohol gel was made by adding 1/10 its weight of catalyst (10% sodium hydroxide in methanol) to a 30% dope of V-22 polyvinyl acetate in 93.5% methanol (6.5% water). The gel was ground while still fresh and allowed to synerese for one day at room temperature. The syneresed liquid was discarded and the gel was divided in two parts. One part was covered with approximately 160% its weight of water and allowed to soak with occasional stirring for 2 days, then washed in water and drained. The other part was washed without a preliminary 2 days' soaking. Analysis showed the advantage of the soaking in giving increased solids content of the final gel.

*Soaked.*—16.13% solids: 2.28% polyvinyl acetate 65° C. M. S. T.

*Unsoaked.*—9.94% solids: 2.41% polyvinyl acetate 61° C. M. S. T.

*Example 35.—Equivalency of alkali hydroxide*

To various samples of 24% methanolic dopes of V-80 polyvinyl acetate were added methanolic solutions of lithium hydroxide, sodium hydroxide, and potassium hydroxide in proportions of 0.015 and 0.030 mole of alkali per mole of polyvinyl acetate. Gels set up within a few minutes in all cases. After standing at room temperature for 48 hours, the gels were sliced, washed, ground in a meat grinder, further washed, drained, and analyzed. Analysis figures shown below indicate that these three alkalies are equivalent to each other.

TABLE XII

| Hydroxide | Moles/mole PVAc | Percent Solids | Percent PVAc |
|---|---|---|---|
| LiOH | 0.015 | 11.99 | 2.19 |
| NaOH | 0.015 | 11.70 | 2.41 |
| KOH | 0.015 | 11.48 | 2.46 |
| LiOH | 0.030 | 12.35 | 1.19 |
| NaOH | 0.030 | 12.83 | 1.31 |
| KOH | 0.030 | 12.13 | 1.35 |

*Example 36.—Specific conductivity of gels*

Samples of polyvinyl alcohols made in accordance with our invention were ashed, using sulfuric acid to convert any metallic salts to sulfate. The percent ash as sulfate is shown in the table below. Samples of the same polyvinyl alcohols were dissolved by heating and stirring in boiled distilled water to make 2.0% dopes. The dopes were filtered, and their resistance was measured using a Wheatstone bridge. The specific conductivity of the various dopes and the water which was used in making them is shown in the table below: Two unwashed samples and two commercial samples were similarly ashed and doped for conductivity measurements for comparison. The table clearly indicates the improvement obtainable by washing in accordance with our invention:

TABLE XII

| Method | Ash as Sulfate, percent | Specific Conductivity |
|---|---|---|
| Alkali V-22 Tray | 0.1 | 0.00535 |
| Acid V-22 Tray | <0.1 | 0.00510 |
| Do | <0.1 | 0.00464 |
| Alkali V-9 Tray | 0.4 | 0.00968 |
| Alkali V-80 Crock | 0.2 | 0.0085 |
| Unwashed | 3.1 | 0.060 |
| Unwashed | 3.6 | 0.0818 |
| Commercial Sample #1 | 2.6 | 0.053 |
| Commercial Sample #2 | 1.5 | 0.035 |
| Boiled distilled water | | 0.000316 |

Our improved process thus permits the production of highly purified polyvinyl alcohol without employing the steps of precipitating, drying, and removal of solvent by distillation, which steps heretofore employed in this field increase the cost of operation through handling and use of expensive equipment. Handling the polyvinyl alcohol in gel form and eliminating the precipitating, drying and distillation steps also eliminates the possibility of potential contamination during such precipitation, drying and distillation steps. Especially important in the production of polyvinyl alcohol for use in photographic emulsions is the elimination of the drying step formerly employed in obtaining polyvinyl alcohol as a dry powder. We have found that in many instances drying the polyvinyl alcohol causes it to case harden and this intereferes with remelting when the photographic emulsion is being prepared. It is also more difficult to put dry powder into solution than it is to melt a gel and, therefore, the preparation of photographic emulsions is facilitated by employing the highly purfied polyvinyl alcohol in gel form.

We claim:

1. The method of preparing a highly pure polyvinyl alcohol which comprises deacetylating polyvinyl acetate while in a alcohol solution by the aid of an alkali deacetylating catalyst to form a polyvinyl alcohol gel, continuing the deacetylation to produce a gel which is insoluble in water having a temperature not greater than approximately 50° C., and washing the gel with water having a temperature not greater than approximately 50° C. until substantially free from the reaction by-products and residual catalyst.

2. The method of preparing a highly pure polyvinyl alcohol which comprises deacetylating polyvinyl acetate in methanol containing not more than 15% water by the aid of an alkali deacetylating catalyst to form a polyvinyl alcohol gel which is insoluble in water having a temperature not greater than approximately 50° C. and washing the gel with water having a temperature not greater than approximately 50° C. until substantially free from reaction by-products and residual catalyst.

3. The method of preparing a highly pure polyvinyl alcohol which comprises deacetylating polyvinyl acetate while in a methanol solution by the aid of a deacetylating catalyst selected from the group consisting of sodium hydroxide, potassium hydroxide, sodium methoxide, and lithium hydroxide to form a polyvinyl alcohol gel, continuing the deacetylation to produce a gel which is insoluble in water having a temperature not greater than approximately 50° C. and washing the gel with water having a temperature not greater than approximately 50° C. until substantially free from the reaction by-products and residual catalyst.

4. The method of preparing a highly pure polyvinyl alcohol which comprises deacetylating polyvinyl acetate in alcoholic solution in the presence of a deacetylation catalyst selected from the group consisting of sodium hydroxide, potassium hydroxide, sodium methoxide, and lithium hydroxide to form a polyvinyl alcohol gel, permitting the gel to synerese, separating the syneresed liquid from the gel, continuing the deacetylation with fresh catalyst in alcoholic solution to remove residual acetyl, and washing the thus formed water-insoluble polyvinyl alcohol gel with water having a temperature not greater than approximately 50° C. until substantially free from other material.

5. The method of preparing a highly pure polyvinyl alcohol which comprises deacetylating polyvinyl acetate in alcoholic solution in the presence of an aqueous deacetylation catalyst selected from the group consisting of aqueous sodium hydroxide, aqueous potassium hydroxide, and aqueous lithium hydroxide to form a polyvinyl alcohol gel, permitting the gel to synerese, separating the syneresed liquid from the gel, continuing the deacetylation with fresh deacetylation agent in aqueous solution to remove residual acetyl, and washing the thus formed water-insoluble polyvinyl alcohol gel with water having a temperature not greater than approximately 50° C. until substantially free from other material.

6. The method of preparing a highly pure polyvinyl alcohol which comprises deacetylating polyvinyl acetate in alcoholic solution in the presence of an alkali deacetylation catalyst selected from the group consisting of sodium hydroxide, potassium hydroxide, sodium methoxide, and lithium hydroxide to form a polyvinyl alcohol gel, permitting the gel to synerese, separating the syneresed liquid from the gel, continuing the deacetylation with fresh alkali catalyst in alcoholic solution to remove additional acetyl, permitting the gel to drain, and continuing the deacetylation with fresh acid deacetylation catalyst in alcoholic solution, the acid being one selected from the group consisting of hydrochloric acid and sulfuric acid to form a gel which is insoluble in water having a temperature not greater than approximately 50° C. and washing the gel with water having a temperature not greater than approximately 50° C. until substantially free from reaction by-products and residual catalyst.

7. The method of preparing a highly pure polyvinyl alcohol which comprises deacetylating polyvinyl acetate in alcoholic solution in the presence of an alkali deacetylation catalyst selected from the group consisting of sodium hydroxide potassium hydroxide, sodium methoxide, and lithium hydroxide to form a polyvinyl alcohol gel, permitting the gel to synerese, separating the syneresed liquid from the gel and continuing the deacetylation with aqueous acid deacetylation catalyst, the acid being one selected from the group consisting of hydrochloric acid and sulfuric acid to form a gel which is insoluble in water having a temperature not greater than approximately 50° C. and washing the gel with water having a temperature not greater than approximately 50° C. until substantially free from reaction by-products and residual catalyst.

8. The method of preparing a highly pure polyvinyl alcohol which comprises deacetylating polyvinyl acetate in alcoholic solution in the presence of an alkali deacetylation catalyst selected from the group consisting of sodium hydroxide, potassium hydroxide, sodium methoxide, and lithium hydroxide to form a polyvinyl alcohol gel, permitting the gel to synerese, separating the syneresed liquid from the gel, continuing the deacetylation with fresh alkali catalyst in alcoholic solution to remove additional acetyl, permitting the gel to drain, and continuing the deacetylation with fresh alkali in aqueous solution, and finally washing the gel with water having a temperature not greater than approximately 50° C. until substantially free from reaction by-products and residual catalyst.

9. The method of preparing a highly pure polyvinyl alcohol which comprises deacetylating polyvinyl acetate in alcoholic solution in the presence of an alkali deacetylation catalyst selected from the group consisting of sodium hydroxide, potassium hydroxide, sodium methoxide, and lithium hydroxide to form a polyvinyl alcohol gel, permitting the gel to synerese, separating the syneresed liquid from the gel, continuing the deacetylation with fresh alkali catalyst in alcoholic solution to remove additional acetyl, permitting the gel to drain, and continuing the deacetylation with aqueous acid deacetylation catalyst, the acid being one selected from the group consisting of hydrochloric acid and sulfuric acid to form a gel which is insoluble in water having a temperature not greater than approximately 50° C. and washing the gel with water having a temperature not greater than approximately 50° C. until substantially free from reaction by-products and residual catalyst.

10. The method of preparing a highly pure polyvinyl alcohol which comprises deacetylating polyvinyl acetate in alcoholic solution in the presence of an alkali deacetylation catalyst selected from the group consisting of sodium hydroxide, potassium hydroxide, sodium methoxide, and lithium hydroxide to form a polyvinyl alcohol gel, permitting the gel to synerese, separating the syneresed liquid from the gel, continuing the deacetylation with fresh alkali catalyst in alcoholic solution to remove additional acetyl, washing the gel with water to remove reaction by-products and residual catalyst, and continuing the deacetylation with aqueous acid, the acid being one selected from the group consisting of hydrochloric acid and sulfuric acid to form a gel which is insoluble in water having a temperature not greater than approximately 50° C. and washing the gel with water having a temperature not greater than approximately 50° C. until substantially free from reaction by-products and residual catalyst.

11. The method of preparing a highly pure polyvinyl alcohol which comprises deacetylating polyvinyl acetate in alcoholic solution in the presence of an alkali deacetylation catalyst selected from the group consisting of sodium hydroxide, potassium hydroxide, sodium methoxide, and lithium hydroxide to form a polyvinyl alcohol gel, permitting the gel to synerese, separating the syneresed liquid from the gel, continuing the deacetylation with fresh alkali catalyst in alcoholic solution to remove additional acetyl, washing the thus formed gel with water to remove reaction by-products and unreacted catalyst, continuing the deacetylation with fresh aqueous alkali, again washing the gel with water, and continuing the deacetylation with aqueous acid, and finally washing the gel with water, the water employed for the washings having a temperature not greater than approximately 50° C.

12. The method of preparing a highly pure polyvinyl alcohol which comprises subjecting polyvinyl acetate to a treatment with steam and then deacetylating the polyvinyl acetate while in alcoholic solution by the aid of an alkali deacetylating catalyst to form a gel which is insoluble in water and washing the gel with water having a temperature not greater than approximately 50° C. until substantially free from the reaction by-products and residual catalyst.

13. The method of preparing a highly pure and colorless polyvinyl alcohol which comprises treating an alcoholic solution of polyvinyl acetate with hydrogen peroxide, deacetylating the thus treated polyvinyl acetate with a deacetylating catalyst to form a polyvinyl alcohol gel which is insoluble in water having a temperature not greater than approximately 50° C. and washing the gel with water having a temperature not greater than approximately 50° C. until substantially free from the reaction by-products and residual catalysts.

14. The method of preparing a highly pure and colorless polyvinyl alcohol which comprises deacetylating polyvinyl acetate while in methanol solution by the aid of a deacetylating catalyst to form a polyvinyl alcohol gel, soaking the gel in a solution of sulfur dioxide and washing the gel with water having a temperature not greater than approximately 50° C. to remove sulfur dioxide, by-products of the reactions and residual catalyst.

References Cited in the file of this patent

UNITED STATES PATENTS

| | | |
|---|---|---|
| 1,586,803 | Hermann et al. | June 1, 1926 |
| 2,399,653 | Roland | May 7, 1946 |
| 2,467,774 | Plambeck | Apr. 19, 1949 |
| 2,642,420 | Kenyon et al. | June 16, 1953 |

FOREIGN PATENTS

| | | |
|---|---|---|
| 747,879 | Germany | Oct. 18, 1944 |

OTHER REFERENCES

Blaikie et al.: Ind. and Eng. Chem., vol. 18, October 1936, pages 1155–1158.

De Bell et al.: German Plastics Practice, Springfield, Mass., pages 111 to 115, 1946.

Blout et al.: Journ. Amer. Chem. Soc., vol. 70, February 1948, pages 862–864.